US012250634B2

(12) United States Patent
Jiang et al.

(10) Patent No.: US 12,250,634 B2
(45) Date of Patent: Mar. 11, 2025

(54) UPLINK TRANSMISSION METHOD, UPLINK INDICATION METHOD, AND DEVICE

(71) Applicant: VIVO MOBILE COMMUNICATION CO., LTD., Dongguan (CN)

(72) Inventors: Dajie Jiang, Dongguan (CN); Xueming Pan, Dongguan (CN); Xiaodong Shen, Dongguan (CN); Li Chen, Dongguan (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 330 days.

(21) Appl. No.: 17/726,503

(22) Filed: Apr. 21, 2022

(65) Prior Publication Data

US 2022/0248330 A1   Aug. 4, 2022

Related U.S. Application Data

(63) Continuation of application No. PCT/CN2020/122654, filed on Oct. 22, 2020.

(30) Foreign Application Priority Data

Oct. 22, 2019  (CN) .......................... 201911008603.5

(51) Int. Cl.
*H04W 52/02* (2009.01)
*H04L 5/00* (2006.01)
(Continued)

(52) U.S. Cl.
CPC ....... *H04W 52/0235* (2013.01); *H04L 5/0051* (2013.01); *H04W 52/0232* (2013.01); *H04W 72/23* (2023.01); *H04W 72/542* (2023.01)

(58) Field of Classification Search
CPC .......... H04W 52/0235; H04W 72/542; H04W 72/23; H04W 52/0232; H04L 5/0051
See application file for complete search history.

(56) References Cited

U.S. PATENT DOCUMENTS

| 2018/0249459 A1 | 8/2018 | Bala et al. |
| 2019/0215897 A1 | 7/2019 | Babaei et al. |

(Continued)

FOREIGN PATENT DOCUMENTS

| CN | 102487541 A | 6/2012 |
| CN | 107079311 A | 8/2017 |

(Continued)

OTHER PUBLICATIONS

Fourth Office Action issued in related Chinese Application No. 201911008603.5, mailed Jun. 30, 2023, 7 pages.

(Continued)

*Primary Examiner* — Ajay Cattungal
(74) *Attorney, Agent, or Firm* — IPX PLLC

(57) ABSTRACT

An uplink transmission method, an uplink indication method, and a terminal are provided. The uplink transmission method includes: when a terminal has not received a power saving signal, or a received power saving signal indicates that the terminal does monitor a Physical Downlink Control CHannel (PDCCH) in OnDuration, determining, according to indication information received from a network side, whether to perform Channel State Information (CSI) reporting in a corresponding Connected Discontinuous Reception (CDRX) cycle.

19 Claims, 4 Drawing Sheets

(51) Int. Cl.
*H04W 72/23* (2023.01)
*H04W 72/542* (2023.01)

(56) References Cited

U.S. PATENT DOCUMENTS

| | | | | |
|---|---|---|---|---|
| 2020/0029315 | A1* | 1/2020 | Lin | H04W 52/0245 |
| 2021/0084586 | A1* | 3/2021 | Loehr | H04W 76/28 |
| 2022/0191797 | A1* | 6/2022 | Jiang | H04W 72/23 |
| 2022/0217633 | A1* | 7/2022 | Wu | H04W 52/0219 |
| 2023/0017216 | A1* | 1/2023 | Li | H04W 52/0232 |

FOREIGN PATENT DOCUMENTS

| | | |
|---|---|---|
| CN | 109417414 A | 3/2019 |
| CN | 109429258 A | 3/2019 |
| CN | 109511132 A | 3/2019 |
| CN | 110012549 A | 7/2019 |
| CN | 110161728 A | 8/2019 |
| CN | 110351813 A | 10/2019 |
| WO | 2018228361 A1 | 12/2018 |
| WO | 2019160660 A1 | 8/2019 |

OTHER PUBLICATIONS

International Search Report issued in corresponding International Application No. PCT/CN2020/122654, mailed Dec. 28, 2020, 8 pages.
Research in Motion UK Limited, "Way Forward for LTE RAN Enhancements for Diverse Data Applications", 3GPP TSG-RAN WG2 Meeting #73bis, Apr. 15, 2011.
First Office Action issued in related Chinese Application No. 201911008603.5, mailed Dec. 3, 2021, 8 pages.
Third Office Action issued in related Chinese Application No. 201911008603.5, mailed Nov. 8, 2022, 5 pages.
CATT, "PDCCH-Based Power Saving Signal/Channel Design", 3GPP TSG-RAN WG1 Meeting #97, R1-1906350, May 2019, 14 pages.
Fifth Office Action issued in related Chinese Application No. 201911008603.5, mailed Jun. 28, 2024, 8 pages.
Spreadtrum Communications, "Discussion on PDCCH-based power saving channel" 3GPP tsg_ran\wg1_rl1, tsgr1_98b, R1-1910013, Oct. 2019, 16 pages.
Nokia, Nokia Shanghai Bell, "Further details on WUS" 3GPP tsg_ran\wg2_rl2, tsgr2_107bis, R2-1913107, Oct. 2019, 5 pages.

* cited by examiner

UPLINK TRANSMISSION METHOD, UPLINK INDICATION METHOD, AND DEVICE

CROSS-REFERENCE TO RELATED APPLICATIONS

This application is a continuation of International Application No. PCT/CN2020/122654, filed Oct. 22, 2020, which claims priority to Chinese Patent Application No. 201911008603.5, filed Oct. 22, 2019. The entire contents of each of the above-referenced applications are expressly incorporated herein by reference.

TECHNICAL FIELD

Embodiments of the present disclosure relate to the field of communications technologies, and in particular to an uplink transmission method, an uplink indication method, and a terminal.

BACKGROUND

In every Connected Discontinuous Reception (CDRX) cycle of a Radio Resource Control connected (RRC_CONNECTED) state, before OnDuration, a base station transmits a power saving signal to a terminal (such as User Equipment (UE)) or a group of UE (a Downlink Control Information (DCI) format of the power saving signal has been named as DCI format 3_0 in the 3rd Generation Partnership Project (3GPP) based on a Physical Downlink Control CHannel (PDCCH)), and the UE detects the power saving signal at the corresponding time.

Referring to FIG. 1, if the UE receives the power saving signal, and the power saving signal indicates that the UE detects a PDCCH in OnDuration or indicates that the UE wakes up, the UE detects the PDCCH or starts an OnDuration timer.

If the UE receives the power saving signal and the power saving signal indicates that the UE does not detect the PDCCH in the OnDuration or that the UE goes to sleep, the UE does not detect the PDCCH or skips (does not start) the OnDuration timer.

In Release 15 (R15) of protocol in the related art, Channel State Information (CSI) can only be reported during CDRX active time, and the UE cannot perform CSI reporting at a time other than the CDRX active time. If there is no service for a long time, the power saving signal indicates that the UE does not monitor the PDCCH, and the UE does not detect the PDCCH or skips (does not start) the OnDuration timer. According to the R15 of protocol, the UE cannot perform the CSI reporting at this time, which may lead to a UE beam or link failure.

SUMMARY

Embodiments of the present disclosure provide an uplink transmission method, an uplink indication method, and a device, so as to resolve a problem of a beam or link failure because UE cannot perform CSI reporting when a power saving signal indicates that the UE does not monitor a PDCCH.

According to a first aspect, an embodiment of the present disclosure provides an uplink transmission method, applied to a terminal and including:

if the terminal has not received a power saving signal, or a received power saving signal indicates that the terminal does not monitor a physical downlink control channel PDCCH in OnDuration, determining, according to indication from a network side or a specification in a protocol, whether to send a Sounding Reference Signal (SRS) and/or whether to perform channel state information CSI reporting in a corresponding connected discontinuous reception CDRX cycle.

According to a second aspect, an embodiment of the present disclosure further provides an uplink indication method, applied to a network device and including:

sending indication information, where the indication information is used to indicate, when the terminal has not received a power saving signal or has received a power saving signal indicating that the terminal does not monitor a PDCCH in OnDuration, whether the terminal sends a SRS and/or performs CSI reporting in a corresponding CDRX cycle.

According to a third aspect, an embodiment of the present disclosure further provide a terminal, including:

a processing module, configured to, if the terminal has not received a power saving signal, or a received power saving signal indicates that the terminal does not monitor a PDCCH in OnDuration, determine, according to indication from a network side or a specification in a protocol, whether to send a SRS and/or whether to perform CSI reporting in a corresponding CDRX cycle.

According to a fourth aspect, an embodiment of the present disclosure further provides a terminal, including: a memory, a processor, and a program that is stored in the memory and that can be run on the processor, and when the program is executed by the processor, the steps of the uplink transmission method according to the first aspect are implemented.

According to a fifth aspect, an embodiment of the present disclosure further provides a network device, including: a memory, a processor, and a program that is stored in the memory and that can be run on the processor, and when the program is executed by the processor, the steps of the uplink indication method according to the second aspect are implemented.

According to a sixth aspect, an embodiment of the present disclosure further provides a computer readable storage medium, where the computer readable storage medium stores a computer program, and when the computer program is executed by a processor, the steps of the uplink transmission method according to the first aspect are implemented; or the steps of the uplink indication method according to the second aspect are implemented.

In the embodiments of the present disclosure, when the terminal has not received the power saving signal, or the power saving signal received by the terminal indicates that the terminal does not monitor the PDCCH in the OnDuration, a behavior of the terminal may be determined according to indication from the network device or a specification in a protocol, so that the terminal can send the SRS and perform the CSI reporting more flexibly, and a conflict between power consumption of the terminal and a beam or link failure can be balanced.

BRIEF DESCRIPTION OF DRAWINGS

For a person of ordinary skill in the art, various other advantages and benefits will become clearer by reading detailed descriptions of the following optional implementations. Accompanying drawings are merely used for showing the optional implementations, but not considered as a limitation on the present disclosure. In addition, in all the accompanying drawings, a same reference symbol is used to represent a same part. In the accompanying drawings.

DESCRIPTION OF EMBODIMENTS

For ease of understanding the embodiments of the present disclosure, several technical points are first described:

(1) Discontinuous Reception (DRX) in a RRC Idle (RRC_IDLE) State

In Long Term Evolution (LTE) or the fifth generation mobile communications (5G) system, UE in the RRC_IDLE state needs to detect a paging signal sent by a base station at a preset time, and a process of detecting the paging signal is as follows:

blindly detecting a PDCCH corresponding to a Paging-Radio Network Temporary Identifier (P-RNTI); if no PDCCH is detected, ending the detection; if presence of a PDCCH is detected, further detecting a Physical Downlink Shared CHannel (PDSCH) indicated by the PDCCH; if the detected PDSCH is not a paging signal of the UE, ending the detection; otherwise, the detected PDSCH is a paging signal of a user.

During regular detection of the paging signal by the UE in the RRC_IDLE state, the UE seldom receives a paging signal belonging to itself, and power consumption for detection of the PDCCH and PDSCH each time is large, which is not conducive to power saving of the terminal.

(2) DRX in a RRC Connected State

A basic mechanism of the DRX is to configure one DRX cycle (cycle) for the UE in the RRC_CONNECTED state. A DRX cycle includes OnDuration and an Opportunity for DRX. During the OnDuration, the UE monitors and receives the PDCCH (active period). During the opportunity for DRX, the UE does not receive data from a downlink channel to reduce power consumption (sleep period).

Figure 1:
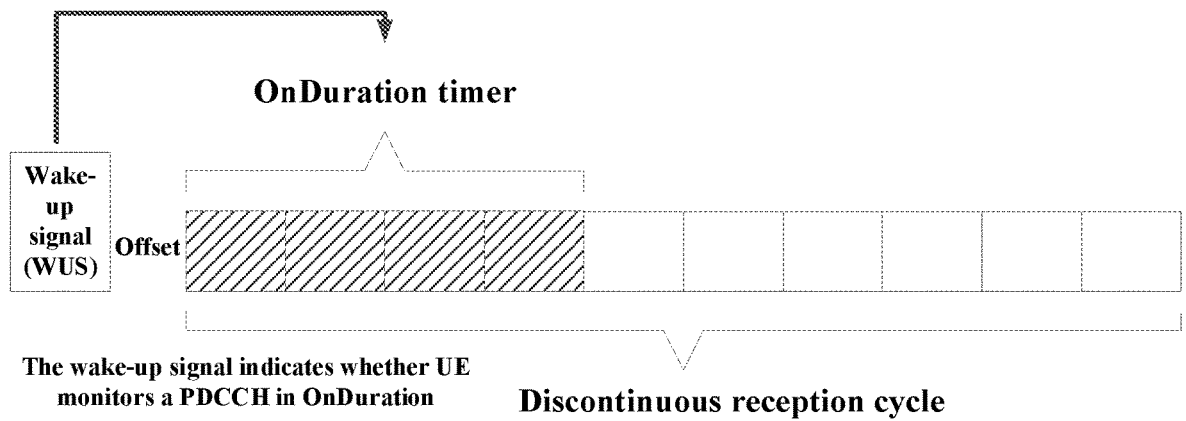
FIG. 1 is a schematic diagram of a wake-up signal of CDRX.
Figure 2:
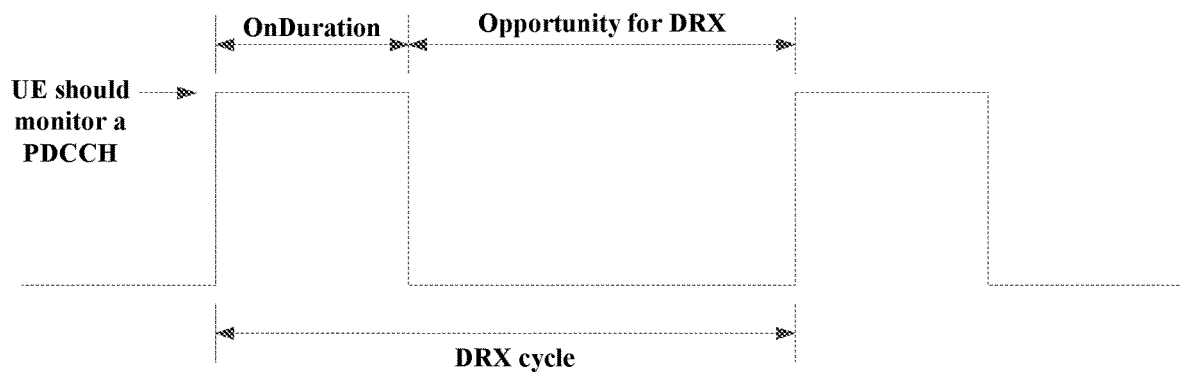
FIG. 2 is a schematic diagram of a DRX cycle.

It can be seen from FIG. 2, in a time domain, time is divided into consecutive DRX cycles.

A sub-frame of a DRX cycle is specified for a drxStart Offset, and the number of sub-frames occupied by a long DRX cycle is specified for a longDRX-Cycle. The two parameters are determined by a longDRX-CycleStartOffset field. The number of consecutive sub-frames (that is, the number of sub-frames kept during an active period) to be monitored for the PDCCH is specified by an OnDuration timer from a start sub-frame of the DRX cycle.

In most cases, when UE is scheduled in a certain sub-frame and receives or sends data, the UE is very likely to be scheduled continuously in the next few sub-frames. An additional delay may arise if such data is not received or sent until a next DRX cycle. To reduce such delay, the UE will be in an active period continuously after being scheduled, that is, it will monitor the PDCCH continuously during a configured active period. An implementation mechanism is as follows: every time when the UE is scheduled to transmit data initially, a timer (such as a drx-InactivityTimer) will be started (or restarted), and the UE will remain in an active state until the timer expires. The drx-InactivityTimer specifies, after the UE successfully decodes one PDCCH indicating uplink (UL) or downlink (DL) user data to be transmitted initially, the number of consecutive sub-frames that are continuously in the active state. That is, the timer is restarted every time when the UE is scheduled to transmit data initially.

To further reduce power consumption of blind detection of a paging signal or PDCCH under the foregoing two kinds of DRX, concepts of a wake-up signal (WUS) and sleep signal (collectively referred to as power saving signals) are proposed.

(3) A Power Saving Signal in the RRC_IDLE or RRC_Inactive State

In each Paging cycle in an idle state, a base station transmits one power saving signal to the UE before a Paging Occasion (PO), and the UE detects the power saving signal at the corresponding time.

If the power saving signal indicates that the UE detects the PDCCH at the PO time, the UE detects the PDCCH.

If the power saving signal does not indicate that the UE detects a PDCCH at the PO time, the UE skips detecting the PDCCH.

In some embodiments, detection of the power saving signal has lower complexity and saves more power than blind detection of the paging signal or PDCCH.

The power saving signal may be a PDCCH-like signal, a sequence-related signal such as a Channel State Information-Reference Signal (CSI-RS), or an On-OffKeying (OOK) signal.

The technical solutions in the embodiments of the present disclosure are described below clearly with reference to the accompanying drawings in the embodiments of the present disclosure. Apparently, the described embodiments are some rather than all of the embodiments of the present disclosure. All other embodiments obtained by a person of ordinary skill in the art based on the embodiments of the present disclosure without creative efforts shall fall within the protection scope of the present disclosure.

The term "include" and any other variants in the specification and claims of this disclosure mean to cover the non-exclusive inclusion, for example, a process, method, system, product, or device that includes a list of steps or units is not necessarily limited to those clearly listed steps or units, but may include other steps or units not clearly listed or inherent to such a process, method, product, or device. In addition, "and/or" used in the specification and claims means at least one of the connected objects. For example, A and/or B represents the following three cases: Only A exists, only B exists, and both A and B exist.

In the embodiments of the present disclosure, the term such as "exemplary" or "for example" is used to represent giving an example, an illustration, or a description. Any embodiment or design scheme described as an "exemplary" or "example" in the embodiments of the present disclosure should not be explained as being more preferred or having more advantages than another embodiment or design scheme. To be precise, the use of the term such as "exemplary" or "for example" is intended to present a related concept in a specific manner.

The technology described herein is not limited to a LTE/LTE-Advanced (LTE-A) system, and can also be used in various wireless communications systems, such as Code Division Multiple Access (CDMA), Time Division Multiple Access (TDMA), Frequency Division Multiple Access (FDMA), Orthogonal Frequency Division Multiple Access (OFDMA), Single-carrier Frequency-Division Multiple Access (SC-FDMA), and other systems.

The terms "system" and "network" are often exchanged in use. The CDMA system can implement radio technologies such as CDMA2000 and Universal Terrestrial Radio Access (UTRA). The UTRA includes Wideband CDMA (WCDMA) and other CDMA variants. The TDMA system can implement radio technologies such as the Global System for Mobile Communications (GSMs). The OFDMA system may implement radio technologies such as Ultra Mobile Broadband (UMB), Evolution-UTRA (E-UTRA), IEEE 802.11 (Wireless Fidelity (Wi-Fi)), IEEE 802.16 (Worldwide Interoperability for Microwave Access (WiMAX)), IEEE 802.20, and Fast Low Latency Access with Seamless Handoff-Orthogonal Frequency Division Multiplexing (Flash-OFDM). The UTRA and E-UTRA are parts of a Universal Mobile Telecommunications System (UMTS). The LTE and more advanced LTE (such as LTE-A) are new UMTS versions that use E-UTRA. The UTRA, E-UTRA, UMTS, LTE, LTE-A, and GSM are described in documents from an organization named "3rd Generation Partnership Project" (3GPP). The CDMA2000 and UMB are described in a document of an origination named "3rd Generation Partnership Project 2" (3GPP2). The technologies described in the present disclosure may also be used in the foregoing systems and radio technologies, and may also be used in another system and radio technology.

Figure 3:
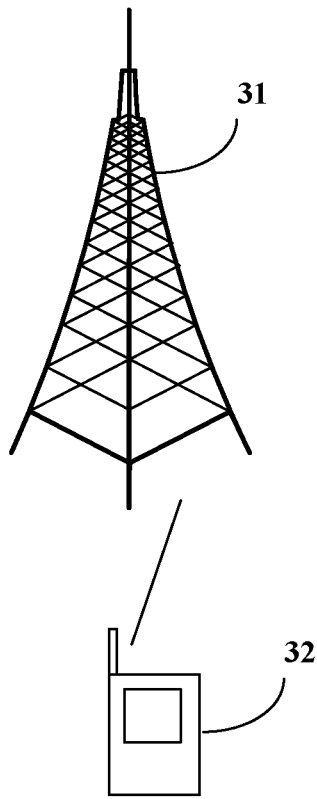
FIG. 3 is a schematic architectural diagram of a wireless communications system according to an embodiment of the present disclosure.

The embodiments of the present disclosure are described below with reference to the accompanying drawings. An uplink transmission method and a device provided in the embodiments of the present disclosure may be applied to a wireless communications system. FIG. 3 is a schematic architectural diagram of a wireless communications system according to an embodiment of the present disclosure. As shown in FIG. 3, the wireless communications system may include: a network device 31 and a terminal 32. The terminal 32 may be denoted as a UE32, and the terminal 32 may communicate with the network device 31 (to transmit signaling or transmit data). In actual application, a connection between the devices is a wireless connection. For ease of visually indicating a connection relationship between the devices, a solid line is used for illustration in FIG. 3.

The network device 31 provided in this embodiment of the present disclosure may be a base station, and the base station may be a commonly used base station, or may be an evolved Node Base station (eNB), or may be a device such as a network device (for example, a next generation Node Base station (gNB) or a Transmission and Reception Point (TRP)) in a 5G system.

The terminal 32 provided in this embodiment of the present disclosure may be a mobile phone, a tablet computer, a notebook computer, an Ultra-Mobile Personal Computer (UMPC), a netbook, a Personal Digital Assistant (PDA), a Mobile Internet Device (MID), a wearable device, an in-vehicle device, or the like.

Figure 4:
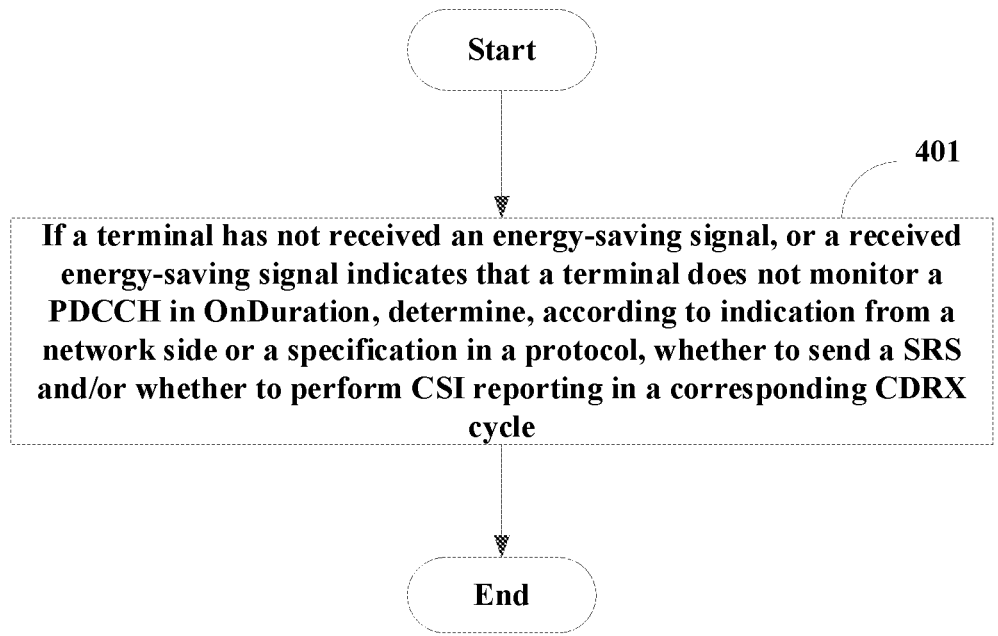
FIG. 4 is a schematic diagram of an uplink transmission method according to an embodiment of the present disclosure.

Referring to FIG. 4, an embodiment of the present disclosure provides an uplink transmission method. The method is performed by a terminal and specifically includes step 401.

Step 401: If a terminal has not received a power saving signal, or a received power saving signal indicates that the terminal does not monitor a PDCCH in OnDuration, determining, according to indication from a network side or a specification in a protocol, whether to send a SRS and/or whether to perform CSI reporting in a corresponding CDRX cycle.

Whether to send a SRS and/or whether to perform CSI reporting includes the following situations: (1) skipping sending the SRS; (2) sending the SRS; (3) performing the CSI reporting; (4) skipping performing the CSI reporting; (5) performing the CSI reporting and skipping sending the SRS; (6) sending the SRS and performing the CSI reporting; (7) skipping sending the SRS and skipping performing the CSI reporting; (8) and sending the SRS and skipping performing the CSI reporting.

In some embodiments, the SRS may include a semi-persistent sounding reference signal (Semi-Persistent SRS, SP-SRS) and/or a Periodic SRS (P-SRS).

In some embodiments, the CSI reporting may be extended to CSI reporting and/or CSI measurement, such as beam measurement. That is, if the terminal has not received the power saving signal, or a received power saving signal indicates that the terminal does not monitor the PDCCH in the OnDuration, determining, according to the indication from the network side or the specification in a protocol, whether to perform the CSI-RS or Synchronization Signal Block (SSB) measurement in a corresponding CDRX cycle. The indication from the network side includes one of the following: 1) performing the CSI-RS or SSB measurement; 2) skipping performing the CSI-RS or SSB measurement.

In some embodiments, a CSI resource may include: a Non-Zero Power CSI-RS (NZP-CSI-RS) resource and/or a synchronization signal block (synchronization Signal and PBCH block, SSB) resource.

In some embodiments, the CDRX cycle includes one of the following: (1) the OnDuration of CDRX; (2) active time (active time) of the CDRX; (3) other time in the CDRX cycle except the OnDuration of the CDRX and/or the active time of the CDRX, that is, other time in the CDRX cycle.

In some embodiments, that the terminal has not received the power saving signal, or the terminal has received the power saving signal and the received power saving signal indicates that the terminal does not monitor the physical downlink control channel PDCCH in the OnDuration specifically includes:

In a monitoring occasion of the power saving signal, the terminal has not received the power saving signal, or has received the power saving signal and the power saving signal indicates that the terminal does not monitor the PDCCH in the OnDuration. The monitoring occasion refers to a time slot in which the power saving signal is sent, for example, it specifically includes an OFDM symbol of the power saving signal monitored in the time slot.

In some implementations, indication information from a network side is received, and it is determined, according to the indication information, to perform a first behavior in the corresponding CDRX cycle.

The first behavior is one of the foregoing situations: whether to send the SRS and/or whether to perform the CSI reporting, and includes one of the following:

(1) sending the SRS and/or performing the CSI reporting, so that when the UE skips the OnDuration or active time, it still sends the SRS and/or performs the CSI reporting in the CDRX cycle, such as the OnDuration, which can prevent the influence of skipping sending the SRS and performing the CSI reporting by the UE on beam or link management, reducing a probability of a UE beam or link failure;

(2) skipping sending the SRS and/or performing the CSI reporting, which can prevent the influence of skipping performing the CSI reporting by the UE on beam or link management, reducing a probability of a UE beam or link failure and reducing power consumption of the UE due to reduction of unnecessary SRS sending;

(3) sending the SRS and/or skipping performing the CSI reporting, which can prevent the influence of skipping sending the SRS by the UE on beam or link management, reducing a probability of a UE beam or link failure and reducing power consumption of the UE due to reduction of unnecessary CSI reporting; or (4) skipping sending the SRS and/or skipping performing the CSI reporting, so as to reduce unnecessary sending of the SRS and performing of the CSI reporting, thereby reducing the power consumption of the UE.

In some embodiments, the indication information indicates, when no power saving signal has not been received, or when a power saving signal has been received and the power saving signal indicates that the terminal does not monitor the PDCCH in the OnDuration, whether the terminal sends the SRS and/or performs the CSI reporting in the corresponding CDRX cycle.

In some embodiments, the indication information may be RRC signaling or another piece of signaling/information.

In this embodiment of the present disclosure, a behavior of the terminal is determined by the terminal through indication information, which can make the terminal more flexible in sending the SRS and performing the CSI reporting and balancing a conflict between power consumption of the terminal and the beam or link failure.

In some implementations, a second behavior is performed in a corresponding CDRX cycle according to a specification in a protocol.

The second behavior includes one of the following:
(1) sending the SRS and/or performing the CSI reporting;
(2) skipping sending the SRS and/or performing the CSI reporting;
(3) sending the SRS and/or skipping performing the CSI reporting; or
(4) skipping sending the SRS and/or skipping performing the CSI reporting.

Further, if no indication is received from the network side, the foregoing second behavior is performed in the corresponding CDRX cycle according to the specification in a protocol.

In some implementations, the indication information includes configuration information for CSI report. The configuration information for CSI report (e.g., CSI-ReportConfig) includes one or more of the following: one or more CSI report quantities (reportQuantity) that are reported; and one or more CSI report quantities that are not reported. A CSI report quantity can indicate a type of the CSI report quantity, for example, a CSI-RS Resource Indicator-RankIndicator-Precoding Matrix Indicator-Channel Quality Indicator (cri-RI-PMI-CQI), a CSI-RS Resource Indicator-Reference Signal Received Power (CRI-RSRP), or the like.

In some embodiments, the CSI report quantity includes one of the following:
(1) a CRI-RSRP;
(2) a Reference Signal Received Power of a synchronization signal block (ssb-Index-RSRP);
(3) a cri-RI-PMI-CQI, that is a channel quality indicator corresponding to a channel state information reference signal resource indicator, a rank indicator, and a precoding matrix indicator;
(4) a CSI-RS Resource Indicator-Rank Indicator-i1 (cri-RI-i1), that is, an i1 corresponding to the channel state information reference signal resource indicator and the rank indicator;
(5) a cri-RI-i1-Channel Quality Indicator (cri-RI-i1-CQI), that is, a channel quality indicator corresponding to the channel state information reference signal resource indicator, the rank indicator, and the i1;
(6) a CSI-RS Resource Indicator-Rank Indicator-CQI (cri-RI-CQI), that is, a channel quality indicator corresponding to the channel state information reference signal resource indicator and the rank indicator; and
(7) a CSI-RS Resource Indicator-Rank Indicator-Level Indicator-Precoding Matrix Indicator-Channel Quality Indicator (cri-RI-LI-PMI-CQI), that is, a channel quality indicator corresponding to the channel state information reference signal resource indicator, the rank indicator, the level indicator, and the precoding matrix indicator.

The indication information may indicate that the terminal reports some CSI report quantities, or indicates that the terminal does not report some CSI report quantities, or indicates that the terminal reports some CSI report quantities or does not report some CSI report quantities. A specific indication mode may include, but is not limited to, a bitmap mode, for example, 1 bit corresponds to one CSI report quantity, and different values of bits indicate whether to perform reporting or not; a report list of the CSI report quantities, where each CSI report quantity that appears in this list is reported, and each CSI report quantity that does not appear in this list is not reported; a list of non-reported CSI report quantities, where each CSI report quantity that appears in this list is not reported, and each CSI report quantity that does not appear in this list is reported; and when there are both a list of reported CSI report quantities and a list of non-reported CSI report quantities, it is determined whether or not to report CSI report quantities that do not appear in these two lists based on the terminal, or both are reported by default, or none is reported by default.

For example, the CSI report quantities reported by the UE are CSI report quantities of 'cri-RSRP' and/or 'ssb-Index-RSRP', and another type of CSI report quantities may not be reported; or the CSI report quantities reported by the UE are CSI report quantities of 'cri-RI-PMI-CQI' and/or 'cri-RI-i1', and another type of CSI report quantities may not be reported; or the CSI report quantities reported by the UE are CSI report quantities of 'cri-RI-i1-CQI' and/or 'cri-RI-CQ', and another type of CSI report quantities may not be reported.

It should be noted that the foregoing report quantities are only an example, and other unlisted CSI report quantities will not be listed.

In this embodiment, when the terminal has not received the power saving signal, or the power saving signal received by the terminal indicates that the terminal does monitor the PDCCH in the OnDuration, a behavior of the terminal may be determined according to the indication from the network device or the specification in a protocol, so that the terminal can send the SRS and perform the CSI reporting more flexibly, and the conflict between the power consumption of the terminal and the beam or link failure can be balanced.

Figure 5:
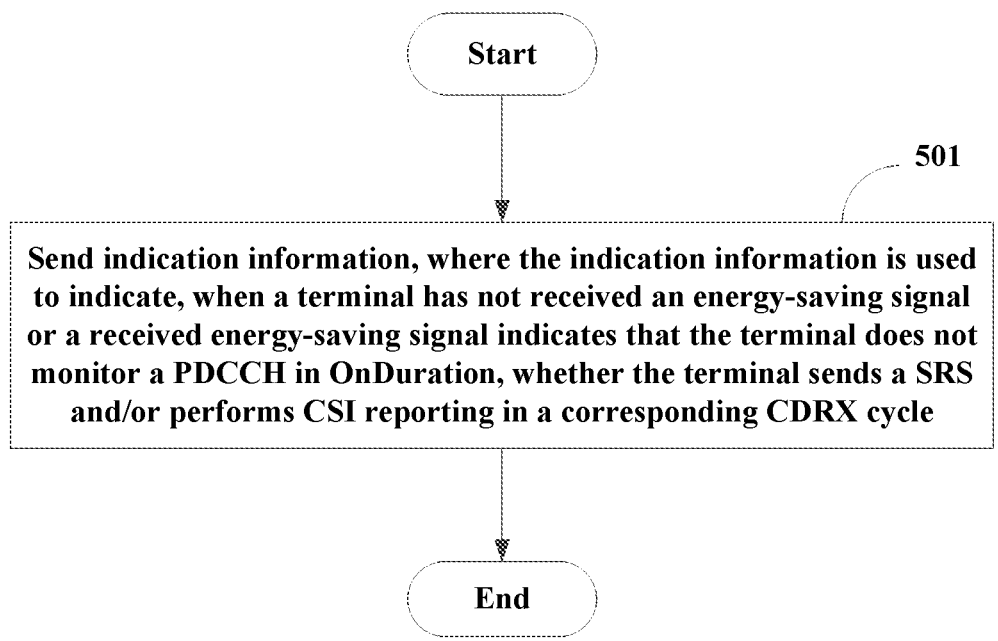
FIG. 5 is a schematic diagram of an uplink indication method according to an embodiment of the present disclosure.

Referring to FIG. 5, an embodiment of the present disclosure provides an uplink indication method. The method is performed by a network device, and includes step 501.

Step 501: Send indication information, where the indication information is used to indicate, when the terminal has not received a power saving signal or a received power saving signal indicates that the terminal does not monitor a PDCCH in OnDuration, whether the terminal sends a SRS and/or performs CSI reporting in a corresponding CDRX cycle.

Whether to send a SRS and/or whether to perform CSI reporting includes the following situations: (1) skipping sending the SRS; (2) sending the SRS; (3) performing the CSI reporting; (4) skipping performing the CSI reporting; (5) performing the CSI reporting and skipping sending the SRS; (6) sending the SRS and performing the CSI reporting; (7) skipping sending the SRS and skipping performing the CSI reporting; (8) and sending the SRS and skipping performing the CSI reporting.

For example, the network device sends first indication information to the terminal indicating that the SRS is not sent, which can reduce unnecessary SRS sending, thereby reducing power consumption of the terminal.

For example, the network device sends second indication information to the terminal to indicate that the SRS is sent, which can prevent the influence on beam or link management due to skipping sending the SRS by the UE for a long time, reducing a probability of a UE beam or link failure.

For example, the network device sends third indication information to the terminal, which is used to indicate that CSI reporting is not performed, so that unnecessary CSI reporting can be reduced and power consumption of the terminal can be reduced.

For example, the network device sends fourth indication information to the terminal to indicate that CSI reporting is performed, which can prevent the influence on the beam or link management due to skipping performing the CSI reporting by the UE for a long time, and reduce the probability of the UE beam or link failure.

For example, the network device sends fifth indication information to the terminal to indicate that the SRS is not sent and the CSI reporting is performed, which can prevent the influence on the beam or link management due to skipping performing the CSI reporting by the UE for a long time, and reduce unnecessary SRS sending, thereby reducing the power consumption of the UE.

For example, the network device sends sixth indication information to the terminal to indicate that the SRS is sent and the CSI reporting is performed, which can prevent the influence on the beam or link management due to skipping performing the CSI reporting and skipping sending the SRS through the UE for a long time, reducing the probability of the UE beam or link failure.

For example, the network device sends seventh indication information to the terminal, which is used to indicate that the SRS is not sent and the CSI reporting is not performed, so as to reduce unnecessary SRS sending and CSI reporting, reducing the power consumption of the UE.

For example, the network device sends eighth indication information to the terminal to indicate that the SRS is sent and no CSI is reported, which can prevent the influence on the beam or link management due to skipping sending the SRS by the UE for a long time, reducing the probability of the beam or link failure of the UE and reducing unnecessary CSI reporting, thereby reducing the power consumption of the UE.

In some embodiments, the SRS may include a SP-SRS and/or P-SRS.

In some embodiments, the CDRX cycle includes one of the following: (1) the OnDuration of CDRX; (2) active time of the CDRX; (3) other time in the CDRX cycle except the OnDuration of the CDRX and/or the active time of the CDRX, that is, other time in the CDRX cycle.

In some embodiments, that the terminal has not received the power saving signal, or the received power saving signal indicates that the terminal does not monitor the physical downlink control channel PDCCH in the OnDuration specifically includes:

In a monitoring occasion of the power saving signal, the terminal has not received the power saving signal, or the received power saving signal indicates that the terminal does not monitor the PDCCH in the OnDuration.

In some implementations, configuration information for CSI report is sent to the terminal. The configuration information for CSI report includes one or more of the following: one or more CSI report quantities that are reported; and one or more CSI report quantities that are not reported.

The CSI report quantities may indicate a type of CSI report quantities, such as a channel state information reference signal resource indicator-rank indicator-precoding matrix indicator-channel quality indicator, or a channel state information reference signal resource indicator-reference signal received power.

In some embodiments, the CSI report quantity includes one of the following:
 (1) a CRI-RSRP;
 (2) a ssb-Index-RSRP;
 (3) a cri-RI-PMI-CQI;
 (4) a cri-RI-i1;
 (5) a cri-RI-i1-CQI;
 (6) a cri-RI-CQI; and
 (7) a cri-RI-LI-PMI-CQI.

In this embodiment of the present disclosure, when the terminal has not received the power saving signal, or the received power saving signal indicates that the terminal does not monitor the PDCCH in the OnDuration, the network device may indicate a behavior of the terminal, so that the terminal can send the SRS and perform the CSI reporting more flexibly, and a conflict between power consumption of the terminal and a beam or link failure can be balanced.

The following describes, in combination with Example 1 and Example 2, a way of determining, according to indication from a network side or a specification in a protocol, whether to send a sounding reference signal SRS and/or whether to perform channel state information CSI reporting in a corresponding connected discontinuous reception CDRX cycle, when a terminal has not received a power saving signal, or has received a power saving signal and the received power saving signal indicates that the terminal does monitor a PDCCH in OnDuration.

Example 1

Step 1: The UE receives RRC signaling sent by a network side, where the RRC signaling may indicate the following a or b;
 (a) the RRC signaling indicates, when the UE has not detected the power saving signal (a DCI format of the power saving signal is DCI format 3_0), or has received the power saving signal and the power saving signal indicates that the UE does not monitor the PDCCH in the OnDuration, in corresponding OnDuration of the CDRX or at an active time of the CDRX (or at other time in the CDRX cycle), that the UE reports CSI report quantities of 'cri-RSRP' or 'ssb-Index-RSRP', and does not report other types of report quantities;

(b) the RRC signaling indicates, when the UE has not detected the power saving signal (DCI format 3_0), or has received the power saving signal and the power saving signal indicates that the UE does not monitor the PDCCH in the OnDuration, that the UE does not send SRS in corresponding OnDuration of the CDRX or at an active time of the CDRX (or at other time in the CDRX cycle).

A CSI report cycle, a CSI resource, and a type of a CSI report quantity may be configured in advance through another piece of RRC signaling.

Step 2: The UE skips sending the SRS and performs CSI reporting in corresponding OnDuration of the CDRX or at an active time of the CDRX according to the RRC signaling, where the content of CSI report includes 'cri-RSRP' or 'ssb-Index-RSRP'.

In Example 1, the influence on beam or link management due to skipping performing the CSI reporting by the UE can be prevented, so that a probability of a UE beam or link failure can be reduced and unnecessary SRS sending can be reduced, thereby reducing power consumption of the UE.

Example 2

In this embodiment, it is defined in a protocol, when the UE has not detected the power saving signal (DCI format3_0), or has received the power saving signal and the power saving signal indicates that the UE does not monitor the PDCCH in OnDuration, that the UE does not perform the CSI reporting and/or not send the SRS by default in corresponding OnDuration of the CDRX or at an active time of the CDRX (or at other time in the CDRX cycle).

In case that the UE has not received RRC signaling that overrides a default behavior of the UE, when the UE has not detected the power saving signal (DCI format 3_0), or has received the power saving signal and the power saving signal indicates that the UE does not monitor the PDCCH in the OnDuration, that the UE does not perform the CSI reporting or does not send the SRS in corresponding OnDuration of the CDRX or at an active time of the CDRX (or at other time in the CDRX cycle).

In Example 2, unnecessary sending of the SRS and performing of the CSI reporting can be reduced, reducing the power consumption of the UE.

This embodiment of the present disclosure further provides a terminal. A principle of resolving a problem by the terminal is similar to that of the uplink transmission method in the embodiment of the present disclosure. Therefore, for implementation of the terminal, reference may be made to the implementation of the method, and details are not repeated again.

Figure 6:
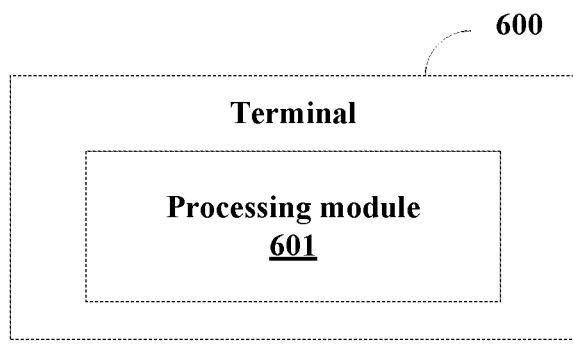
FIG. 6 is a first schematic diagram of a terminal according to an embodiment of the present disclosure.

Referring to FIG. 6, an embodiment of the present disclosure provides a terminal. The terminal 600 includes:

a processing module 601, configured to, if the terminal has not received a power saving signal, or a received power saving signal indicates that the terminal does not monitor a PDCCH in OnDuration, determine, according to indication from a network side or a specification in a protocol, whether to send a SRS and/or whether to perform CSI reporting in a corresponding CDRX cycle.

In some embodiments, the CDRX cycle includes one or more of the following: (1) the OnDuration of CDRX; (2) active time of the CDRX; (3) other time in the CDRX cycle except the OnDuration of the CDRX and/or the active time of the CDRX, that is, other time in the CDRX cycle.

In some embodiments, that the terminal has not received the power saving signal, or the terminal has received the power saving signal and the received power saving signal indicates that the terminal does not monitor the physical downlink control channel PDCCH in the OnDuration specifically includes:

In a monitoring occasion of the power saving signal, the terminal has not received the power saving signal, or the received power saving signal indicates that the terminal does not monitor the PDCCH in the OnDuration.

In some implementations, based on that shown in FIG. 6, the terminal 600 further includes a receiving module configured to receive indication information from the network side.

The processing module 601 is further configured to determine, according to the indication information, that a first behavior is performed in the corresponding CDRX cycle. The first behavior includes one of the following: sending the SRS; skipping sending the SRS; performing the CSI reporting; skipping performing the CSI reporting; sending the SRS and performing the CSI reporting; performing the CSI reporting and skipping sending the SRS; sending the SRS and skipping performing the CSI reporting; or skipping sending the SRS and skipping performing the CSI reporting.

In some implementations, the indication information indicates, when no power saving signal has not been received, or when the power saving signal has been received and the power saving signal indicates that the terminal does not monitor the PDCCH in the OnDuration, whether the terminal sends the SRS and/or performs the CSI reporting in the corresponding CDRX cycle.

In some implementations, the processing module 601 is further configured to perform a second behavior in the corresponding CDRX cycle according to the specification in a protocol.

The second behavior includes one of the following: sending the SRS; skipping sending the SRS; performing the CSI reporting; skipping performing the CSI reporting; sending the SRS and performing the CSI reporting; skipping sending the SRS and performing the CSI reporting; sending the SRS and skipping performing the CSI reporting; or skipping sending the SRS and skipping performing the CSI reporting.

In some implementations, the processing module 601 is further configured to, if no indication is received from the network side, perform the second behavior in the corresponding CDRX cycle according to the specification in a protocol.

In some implementations, the indication information includes configuration information for CSI report. The configuration information for CSI report includes one or more of the following: one or more CSI report quantities that are reported; and one or more CSI report quantities that are not reported.

In some embodiments, the CSI report quantity includes one of the following:
 (1) a CRI-RSRP;
 (2) a ssb-Index-RSRP;
 (3) a cri-RI-PMI-CQI;
 (4) a cri-RI-i1;
 (5) a cri-RI-i1-CQI;
 (6) a cri-RI-CQI; and
 (7) a cri-RI-LI-PMI-CQI.

For example, the UE reports CSI report quantities of 'cri-RSRP' or 'ssb-Index-RSRP', and does not report other types of report quantities.

The terminal provided in this embodiment of the present disclosure can implement the processes performed by the terminal in the method embodiment in FIG. 4. To avoid repetition, details are not described herein again.

Figure 7:
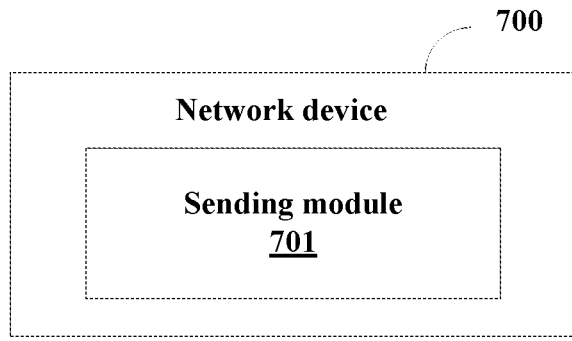
FIG. 7 is a first schematic diagram of a network device according to an embodiment of the present disclosure.

Referring to FIG. 7, an embodiment of the present disclosure further provides a network device. The network device 700 includes:

a sending module 701, configured to send indication information, where the indication information is used to indicate, when a terminal has not received a power saving signal or a received power saving signal indicates that the terminal does not monitor a PDCCH in OnDuration, whether the terminal sends a SRS and/or performs CSI reporting in a corresponding CDRX cycle.

Whether to send a SRS and/or whether to perform CSI reporting includes the following situations: (1) skipping sending the SRS; (2) sending the SRS; (3) performing the CSI reporting; (4) skipping performing the CSI reporting; (5) performing the CSI reporting and skipping sending the SRS; (6) sending the SRS and performing the CSI reporting; (7) skipping sending the SRS and skipping performing the CSI reporting; (8) and sending the SRS and skipping performing the CSI reporting.

In some embodiments, the SRS may include a SP-SRS and/or P-SRS.

In some embodiments, the CDRX cycle includes one or more of the following: (1) the OnDuration of CDRX; (2) active time of the CDRX; (3) other time in the CDRX cycle except the OnDuration of the CDRX and/or the active time of the CDRX, that is, other time in the CDRX cycle.

In some embodiments, that no power saving signal has been received, or a received power saving signal indicates that the terminal does not monitor the physical downlink control channel PDCCH in the OnDuration specifically includes:

In a monitoring occasion of the power saving signal, no power saving signal has been received, or the received power saving signal indicates that the terminal does not monitor the PDCCH in the OnDuration.

In some implementations, the sending module 701 is further configured to send configuration information for CSI report to the terminal. The configuration information for CSI report includes one or more of the following: one or more CSI report quantities that are reported; and one or more CSI report quantities that are not reported.

The CSI report quantities may indicate a type of CSI report quantities, such as a channel state information reference signal resource indicator-rank indicator-precoding matrix indicator-channel quality indicator, or a channel state information reference signal resource indicator-reference signal received power.

In some embodiments, the CSI report quantity includes one of the following:

(1) a CRI-RSRP;
(2) a ssb-Index-RSRP;
(3) a cri-RI-PMI-CQI;
(4) a cri-RI-i1;
(5) a cri-RI-i1-CQI;
(6) a cri-RI-CQI; and
(7) a cri-RI-LI-PMI-CQI.

The terminal provided in this embodiment of the present disclosure can implement the processes performed by the terminal in the method embodiment in FIG. 5. To avoid repetition, details are not described herein again.

Figure 8:
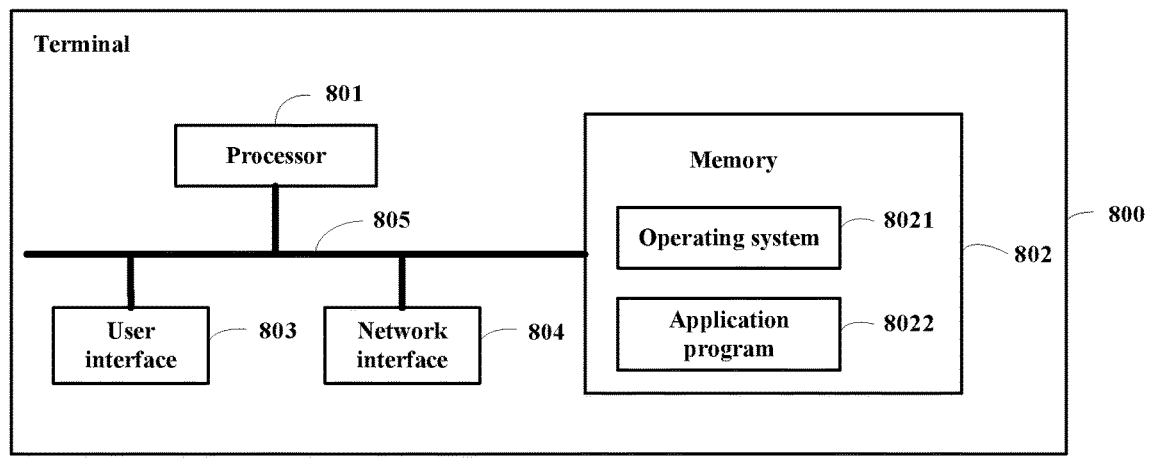
FIG. 8 is a second schematic diagram of a terminal according to an embodiment of the present disclosure.

As shown in FIG. 8, a terminal 800 shown in FIG. 8 includes: at least one processor 801, a memory 802, at least one network interface 804, and a user interface 803. Various components of the terminal 800 are coupled by using a bus system 805. It can be understood that the bus system 805 is configured to implement a connection and communication between these components. In addition to a data bus, the bus system 805 further includes a power bus, a control bus, and a status signal bus. However, for clear description, various buses are marked as the bus system 805 in FIG. 8.

The user interface 803 may include a display, a keyboard, or a click device (for example, a mouse, a trackball, a touchpad, or a touchscreen).

It can be understood that the memory 802 in this embodiment of the present disclosure may be a volatile memory or a nonvolatile memory, or may include both a volatile memory and a nonvolatile memory. The nonvolatile memory may be a Read-Only Memory (ROM), a Programmable ROM (PROM), an Erasable PROM (EPROM), an Electrically EPROM (EEPROM), or a flash memory. The volatile memory may be a Random Access Memory (RAM), which is used as an external cache. Through example but not limitative description, many forms of RAMs may be used, for example, a Static RAM (SRAM), a Dynamic RAM (DRAM), a Synchronous DRAM (SDRAM), a Double Data Rate SDRAM (DDRSDRAM), an Enhanced SDRAM (ESDRAM), a Synch Link DRAM (SLDRAM), and a Direct Rambus RAM (DRRAM). The memory 802 in the system and the method that are described in the embodiments of the present disclosure is intended to include but is not limited to these and any other suitable types of memories.

In some implementations, the memory 802 stores the following element: an executable module or a data structure, a subset of an executable module or a data structure, or an extended set of an executable module or a data structure: an operating system 8021 and an application program 8022.

The operating system 8021 includes various system programs, such as a framework layer, a core library layer, a driver layer, and is configured to implement various basic services and process hardware-based tasks. The application program 8022 includes various applications, for example, a media player, and a browser, to implement various application services. A program implementing the method in the embodiments of the present disclosure may be included in the application program 8022.

In an embodiment of the present disclosure, when a program or an instruction stored in the memory 802 is called, specifically, when a program or an instruction stored in the application program 8022 is executed, the steps of the method in FIG. 4 are implemented.

The terminal provided in this embodiment of the present disclosure may perform the foregoing embodiment of the uplink transmission method. An implementation principle and a technical effect of the terminal are similar to those of the foregoing embodiment, and details are not described again in this embodiment.

Figure 9:
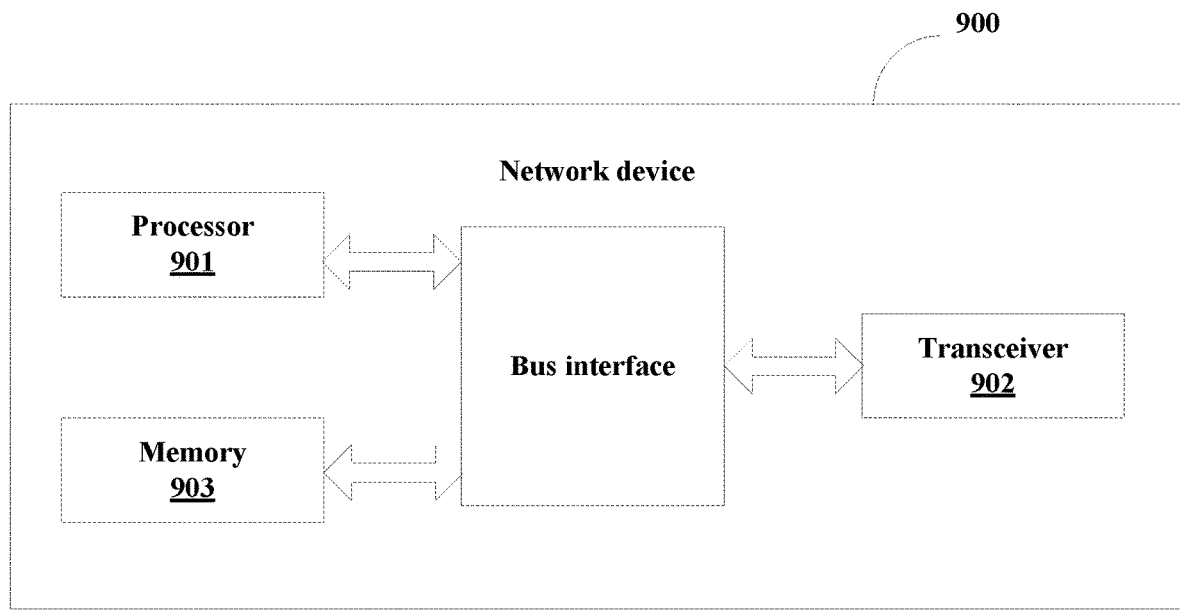
FIG. 9 is a second schematic diagram of a network device according to an embodiment of the present disclosure.

Referring to FIG. 9, FIG. 9 is a structural diagram of a network device applied to an embodiment of the present disclosure. As shown in FIG. 9, the network device 900 includes: a processor 901, a transceiver 902, a memory 903, and a bus interface, where the processor 901 may be responsible for bus architecture management and general processing. The memory 903 may store data used by the processor 901 when the processor performs an operation.

In an embodiment of the present disclosure, the network device 900 further includes: a program that is stored in the memory 903 and that can be run on the processor 901. When the program is executed by the processor 901, steps of the foregoing method in FIG. 5 are implemented.

In FIG. 9, a bus architecture may include any number of interconnected buses and bridges. Specifically, various circuits of one or more processors represented by the processor 901 and a memory represented by the memory 903 are interconnected. The bus architecture may further link other various circuits such as a peripheral device, a voltage stabilizer, and a power management circuit. These are well known in the art, and therefore are not further described in this specification. The bus interface provides an interface. The transceiver 902 may be a plurality of elements, that is, include a transmitter and a receiver, and provide a unit for communicating with other various apparatuses on a transmission medium.

The network device provided in this embodiment of the present disclosure may perform the foregoing method embodiment shown in FIG. 5. An implementation principle and a technical effect of the network device are similar to those of the method embodiment, and details are not described again in this embodiment.

The method or algorithm steps described in combination with content disclosed in the present disclosure may be implemented by hardware, or may be implemented by a processor by executing a software instruction. The software instruction may be formed by a corresponding software module. The software module may be stored in a RAM, a flash memory, a ROM, an EPROM, an EEPROM, a register, a hard disk, a removable hard disk, a read-only compact disc, or a storage medium of any other form known in the art. An exemplary storage medium is coupled to the processor, so that the processor can read information from the storage medium and can write information to the storage medium. Certainly, the storage medium may also be a component of the processor. The processor and the storage medium may be located in the ASIC. In addition, the ASIC may be located in a core network interface device. Certainly, the processor and the storage medium may exist in the core network interface device as discrete components.

A person skilled in the art should be aware that in the foregoing one or more examples, functions described in the present disclosure may be implemented by hardware, software, firmware, or any combination thereof. When implemented by software, the foregoing functions may be stored in a computer-readable medium or transmitted as one or more instructions or code in the computer-readable medium. The computer-readable medium includes a computer storage medium and a communications medium, where the communications medium includes any medium that enables a computer program to be transmitted from one place to another. The storage medium may be any usable medium accessible to a general-purpose or dedicated computer.

The objectives, technical solutions, and beneficial effects of the present disclosure are further described in detail in the foregoing description of implementations. It should be understood that the foregoing descriptions are merely description of implementations of the present disclosure, and are not intended to limit the protection scope of the present disclosure. Any modification, equivalent replacement, improvement, or the like made on the basis of the technical solutions of the present disclosure shall fall within the protection scope of the present disclosure.

A person skilled in the art should understand that the embodiments of the present disclosure can be provided as a method, a system, or a computer program product. Therefore, the embodiments of the present disclosure may be complete hardware embodiments, complete software embodiments, or software-hardware combined embodiments. Moreover, the embodiments of the present disclosure may use a form of a computer program product that is implemented on one or more computer-usable storage media (including but not limited to a magnetic disk memory, a CD-ROM, an optical memory, and the like) that include a computer-usable program code.

The embodiments of the present disclosure are described with reference to the flowcharts and/or block diagrams of the method, the device (system), and the computer program product according to the embodiments of the present disclosure. It should be understood that each process and/or block in the flowchart and/or block diagram as well as a combination of processes and/or blocks in the flowchart and/or block diagram may be implemented by computer program instructions. These computer program instructions can be provided to a general-purpose computer, a special-purpose computer, an embedded processor, or a processor of another programmable data processing device to generate a machine, so that an apparatus configured to implement functions specified in one or more procedures of a flowchart and/or one or more blocks of a block diagram is generated by using the instructions executed by the computer or the processor of the another programmable data processing device.

These computer program instructions may also be stored in a computer readable memory that can instruct the computer or any other programmable data processing device to work in a specific manner, so that the instructions stored in the computer readable memory generate an artifact that includes an instruction apparatus. The instruction apparatus implements a specific function in one or more procedures of the flowchart and/or in one or more blocks of the block diagram.

These computer program instructions may also be loaded into a computer or another programmable data processing device, so that a series of operation steps are executed by the computer or the another programmable device to generate processing implemented by the computer, and the instruction executed on the computer or the another programmable device provides steps of the function specified in one or more procedures of the flowchart and/or one or more blocks of the block diagram.

A person skilled in the art can make various modifications and variations to the embodiments of the present disclosure without departing from the spirit and scope of the present disclosure. In this way, the present disclosure is intended to include these modifications and variations of the embodiments of the present disclosure provided that they fall within the scope of the claims of the present disclosure and their equivalent technologies.

The invention claimed is:

1. An uplink transmission method, executed by a terminal, comprising:

when the terminal has not received a power saving signal, or when the terminal receives the power saving signal which indicates that the terminal does not monitor a Physical Downlink Control CHannel (PDCCH) in OnDuration, determining, according to indication information received from a network side, whether to perform Channel State Information (CSI) reporting in a corresponding Connected Discontinuous Reception (CDRX) cycle, wherein the indication information comprises configuration information for CSI report, wherein the configuration information for CSI report comprises: one or more CSI report quantities that are reported.

2. The uplink transmission method according to claim 1, further comprising:
   receiving the power saving signal; and
   performing the CSI reporting in the corresponding CDRX cycle when the power saving signal indicates that the terminal does not monitor the PDCCH in the OnDuration.

3. The uplink transmission method according to claim 2, wherein the performing the CSI reporting in the corresponding CDRX cycle when the power saving signal indicates that the terminal does not monitor the PDCCH in the OnDuration comprises:
   performing the CSI reporting in the OnDuration of CDRX of the corresponding CDRX cycle when the power saving signal indicates that the terminal does not monitor the PDCCH in the OnDuration.

4. The uplink transmission method according to claim 1, wherein the indication information is used to indicate, when the power saving signal has not been received or the received power saving signal indicates that the terminal does not monitor the PDCCH in the OnDuration, whether the terminal sends a Sounding Reference Signal (SRS) or performs the CSI reporting in the corresponding CDRX cycle.

5. The uplink transmission method according to claim 1, further comprising:
   performing a behavior in the corresponding CDRX cycle according to a specification in a protocol, wherein
   the behavior comprises at least one of the following:
   sending the SRS;
   skipping sending the SRS;
   performing the CSI reporting;
   skipping performing the CSI reporting;
   sending the SRS and performing the CSI reporting;
   performing the CSI reporting and skipping sending the SRS;
   sending the SRS and skipping performing the CSI reporting; or
   skipping sending the SRS and skipping performing the CSI reporting.

6. The uplink transmission method according to claim 5, wherein performing the behavior in the corresponding CDRX cycle according to the specification in the protocol comprises:
   when no indication information is received from the network side, performing the behavior in the corresponding CDRX cycle according to the specification in the protocol.

7. The uplink transmission method according to claim 1, wherein:
   the configuration information for CSI report further comprises one or more CSI report quantities that are not reported.

8. The uplink transmission method according to claim 7, wherein the one or more CSI report quantities comprise at least one of the following:
   a channel state information reference signal resource indicator Reference Signal Received Power (cri-RSRP):
   a reference signal received power of a synchronization signal block;
   a channel state information reference signal resource indicator-Rank Indicator Precoding Matrix Indicator Channel Quality Indicator (cri-RI-PMI-CQI);
   a channel state information reference signal resource indicator-Rank Indicator i1 (cri-RI-i1), wherein the i1 corresponds to the channel state information reference signal resource indicator and the rank indicator:
   a channel state information reference signal resource indicator-Rank Indicator i1-Channel Quality Indicator (cri-RI-i1-CQI):
   a channel state information reference signal resource indicator-Rank Indicator-Channel Quality Indicator channel quality indicator (cri-RI-CQI); or
   a channel state information reference signal resource indicator-Rank Indicator Level Indicator Precoding Matrix Indicator Channel Quality Indicator (cri-RI-LI-PMI-CQI).

9. An uplink indication method, executed by a network device, comprising:
   sending indication information, wherein the indication information is used to indicate, when a terminal has not received a power saving signal, or when the terminal has received the power saving signal indicating that the terminal does not monitor a Physical Downlink Control CHannel (PDCCH) in OnDuration, whether the terminal performs Channel State Information (CSI) reporting in a corresponding Connected Discontinuous Reception (CDRX) cycle, wherein the indication information comprises configuration information for CSI report, wherein the configuration information for CSI report comprises: one or more CSI report quantities that are reported.

10. The uplink indication method according to claim 9, wherein:
    the indication information comprises configuration information for CSI report, wherein the configuration information for CSI report further comprises one or more CSI report quantities that are not reported.

11. The uplink indication method according to claim 10, wherein the one or more CSI report quantities comprise at least one of the following:
    a channel state information reference signal resource indicator Reference Signal Received Power (cri-RSRP):
    a reference signal received power of a synchronization signal block;
    a channel state information reference signal resource indicator-Rank Indicator Precoding Matrix Indicator Channel Quality Indicator (cri-RI-PMI-CQI);
    a channel state information reference signal resource indicator-Rank Indicator i1 (cri-RI-i1), wherein the i1 corresponds to the channel state information reference signal resource indicator and the rank indicator:
    a channel state information reference signal resource indicator-Rank Indicator i1-Channel Quality Indicator (cri-RI-i1-CQI);
    a channel state information reference signal resource indicator-Rank Indicator Channel Quality Indicator (cri-RI-CQI); or
    a channel state information reference signal resource indicator-Rank Indicator Level Indicator Precoding Matrix Indicator Channel Quality Indicator (cri-RI-LI-PMI-CQI).

12. A terminal, comprising a memory, a processor, and a computer program that is stored in the memory and that can be run on the processor, wherein the computer program, when executed by the processor, causes the processor to implement operations comprising:
    when the terminal has not received a power saving signal, or when the terminal receives the power saving signal which indicates that the terminal does not monitor a Physical Downlink Control CHannel (PDCCH) in OnDuration, determining, according to indication information received from a network side, whether to perform Channel State Information (CSI) reporting in a corresponding Connected Discontinuous Reception (CDRX) cycle, wherein the indication information comprises configuration information for CSI report wherein the configuration information for CSI report comprises: one or more CSI report quantities that are reported.

13. The terminal according to claim 12, wherein the operations comprise:
receiving the power saving signal; and
performing the CSI reporting in the corresponding CDRX cycle when the power saving signal indicates that the terminal does not monitor the PDCCH in the OnDuration.

14. The terminal according to claim 13, wherein performing the CSI reporting in the corresponding CDRX cycle when the power saving signal indicates that the terminal does not monitor the PDCCH in the OnDuration comprises:
performing the CSI reporting in the OnDuration of CDRX of the corresponding CDRX cycle when the power saving signal indicates that the terminal does not monitor the PDCCH in the OnDuration.

15. The terminal according to claim 14, wherein the indication information is used to indicate, when the power saving signal has not been received or the received power saving signal indicates that the terminal does not monitor the PDCCH in the OnDuration, whether the terminal sends a Sounding Reference Signal (SRS) or performs the CSI reporting in the corresponding CDRX cycle.

16. The terminal according to claim 12, wherein the operations comprise:
performing a behavior in the corresponding CDRX cycle according to a specification in a protocol, wherein the behavior comprises at least one of the following:
sending the SRS;
skipping sending the SRS;
performing the CSI reporting;
skipping performing the CSI reporting;
sending the SRS and performing the CSI reporting;
performing the CSI reporting and skipping sending the SRS;
sending the SRS and skipping performing the CSI reporting; or
skipping sending the SRS and skipping performing the CSI reporting.

17. The terminal according to claim 16, wherein performing the behavior in the corresponding CDRX cycle according to the specification in the protocol comprises:
when no indication is received from the network side, performing the behavior in the corresponding CDRX cycle according to the specification in the protocol.

18. The terminal according to claim 12, wherein:
the configuration information for CSI report further comprises one or more CSI report quantities that are not reported.

19. The terminal according to claim 18, wherein the one or more CSI report quantities comprise at least one of the following:
a channel state information reference signal resource indicator-Reference Signal Received Power (cri-RSRP);
a reference signal received power of a synchronization signal block;
a channel state information reference signal resource indicator-Rank Indicator Precoding Matrix Indicator Channel Quality Indicator (cri-RI-PMI-CQI);
a channel state information reference signal resource indicator-Rank Indicator i1 (cri-RI-i1), wherein the i1 corresponds to the channel state information reference signal resource indicator and the rank indicator;
a channel state information reference signal resource indicator-Rank Indicator i1-Channel Quality Indicator (cri-RI-i1-CQI);
a channel state information reference signal resource indicator-Rank Indicator Channel Quality Indicator (cri-RI-CQI); or
a channel state information reference signal resource indicator-Rank Indicator level indicator-Precoding Matrix Indicator Channel Quality Indicator (cri-RI-LI-PMI-CQI).

* * * * *